Dec. 16, 1952 U. COCHETTI 2,621,727
EXTENSIBLE SHUTTER CONSTRUCTION
Filed Aug. 9, 1947 2 SHEETS—SHEET 1
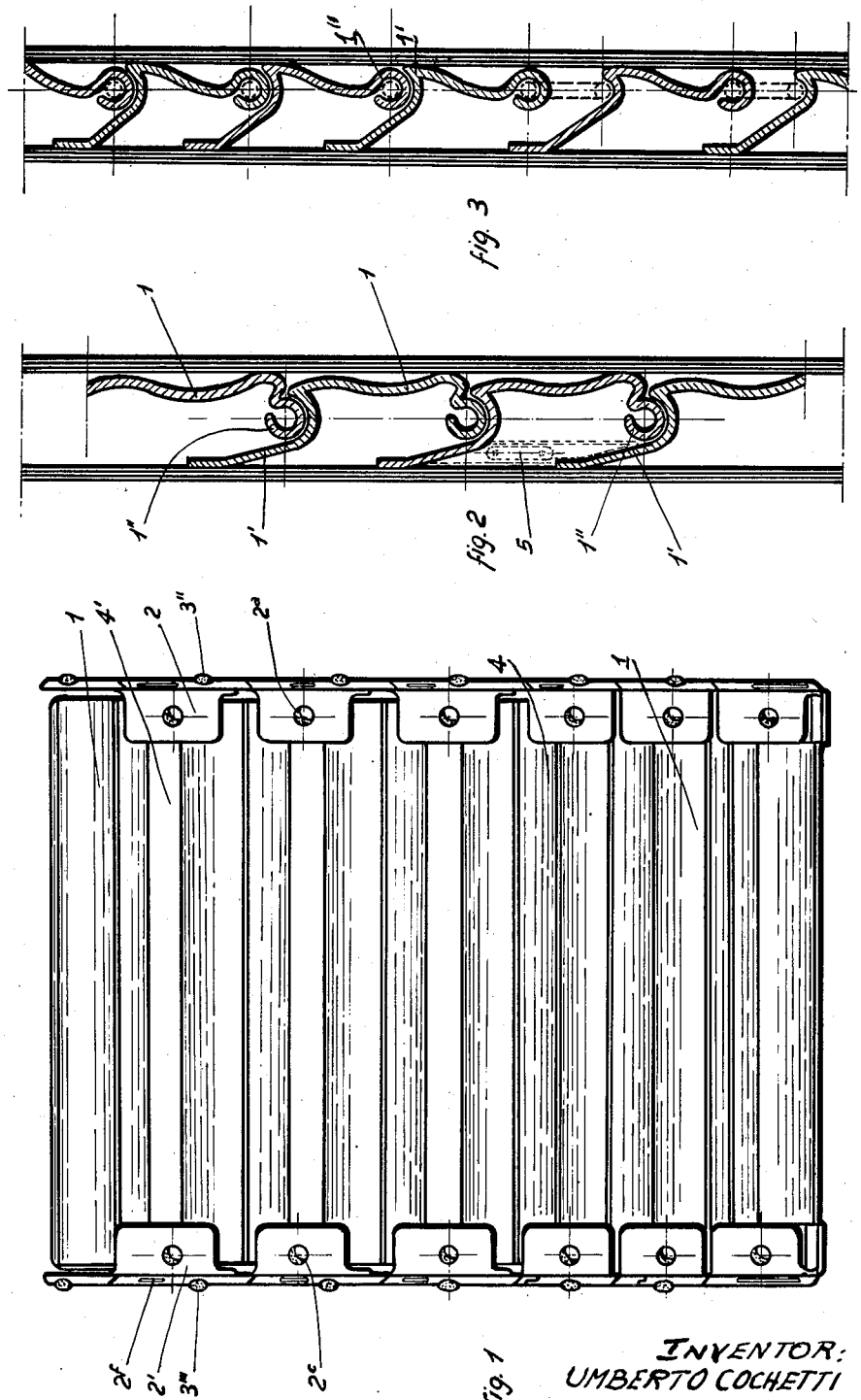
INVENTOR:
UMBERTO COCHETTI

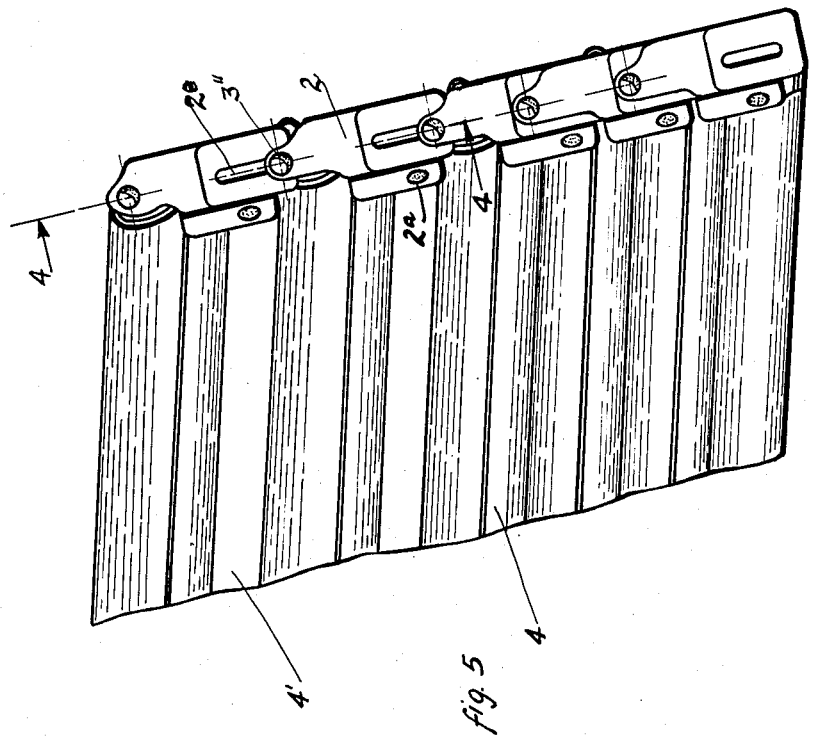
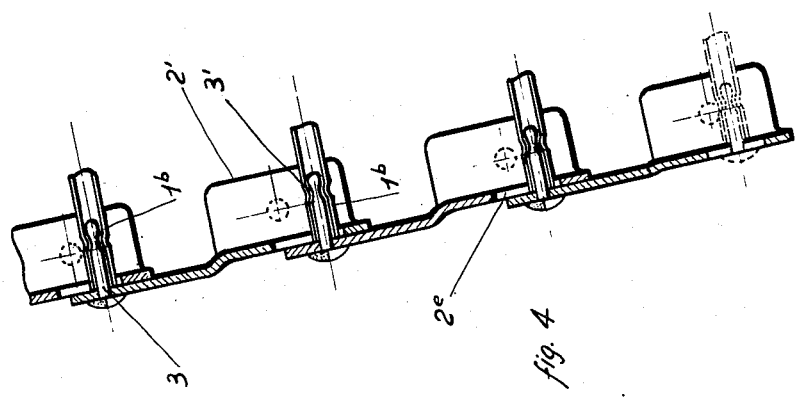

Patented Dec. 16, 1952

2,621,727

UNITED STATES PATENT OFFICE 2,621,727

EXTENSIBLE SHUTTER CONSTRUCTION

Umberto Cochetti, Aosta, Italy

Application August 9, 1947, Serial No. 767,806
In Italy April 30, 1946

Section 1, Public Law 690, August 8, 1946
Patent expires April 30, 1966

4 Claims. (Cl. 160—235)

The present invention deals with a special type of roller-shutter structure which is made of metal and permits gradual aeration of the premises, even if it is closed. Thus, when the shutter has been let down it is possible to obtain passage of light between its blades, if the position of the latter has been previously registered.

Despite the advantage resulting from aeration, it has to be noticed that even if a passage for the light is left, as explained above, between the successive blades of the shutter structure, it is not possible to see into the premises from the outside, owing to the peculiar shape of the blades, the light being projected in a downward direction.

However, from within the premises the possibility remains of seeing to the outside by looking upwards.

The blades are connected together by carrying-devices. These devices predetermine the maximum displacement allowed for the blades to permit passage of light.

The particular shape of the blades permits the hermetical sealing as the blades are kept tightly in their position when they are closed and therefore no light is passing between adjacent blades.

When the shutter has been installed, it runs inside two U-shaped guides. Therefore, to keep the shutter in perfect contact with the inner faces of the guides, the shutter itself is provided with linked carrying-devices which have three projections to engage the inner faces of the guides to make for easy sliding movement therethrough.

The objects of the invention are to provide a shutter which can be substantially hermetically sealed when the blades are elevated and brought close together and which has good ventilation when the blades are separated without the interior of the building being viewed from the outside, which is of simple construction, inexpensive to manufacture, has minimum parts, easy to adjust and efficient in operation.

For a better understanding of the present invention, reference may be had to the following description taken in connection with the accompanying drawing, in which:

Fig. 1 is an elevational view of an extendible window shutter construction embodying features of the present invention;

Fig. 2 is a fragmentary vertical sectional view of the shutter construction of Fig. 1 shown on an enlarged scale;

Fig. 3 is a fragmentary sectional view corresponding to that of Fig. 2 but showing the slats of slightly different shape, the lower two slats being in extended position;

Fig. 4 is a longitudinal section through the center of a series of slat carriers; and Fig. 5 is a fragmentary perspective view of a number of slat carriers and slats, the two slats and slat carriers at the top being shown in extended positions.

Referring now to the drawings in greater detail, the shutter comprises a number of metal slats 1, each supported betwen pairs of slat carriers 2, 2'. Each slat carrier is channel-shaped in section, the central web of the channel having at one end a slot $2^e$ or $2^f$, and at the other end carrying an inwardly directed pivot pin 3 (see Fig. 4). The pins 3 each have an annular groove or neck 3'.

The slats 1 may be formed either with the section shown in Fig. 2 or with that shown in Fig. 3. In either case, they each have a concave groove or depression 1' and a curled-over portion forming a convex ridge 1''. The depression and the ridges extend along the entire length of each slat, as may be visualized from Fig. 1.

When the shutter is assembled, the slat carriers are connected together as shown by passing pivot pins 3 through the slots $2^e$, $2^f$ of the slat carriers 2, 2'. The inwardly projecting ends of the pins 3 are entered into the cavities formed by the curled-over portions 1'' and are retained therein by pressing the metal of the curled-over portions into the constricted neck portions 3', as shown at $1^b$ in Fig. 4. Thus, each pair of pins 3 supports one slat 1.

By drawing apart the slat carriers 2, 2' to the fullest extent permitted by the slots $2^e$, $2^f$, it will be seen that gaps such as 4' (Figs. 1 and 5) are opened betwen adjacent slats. This indicates the extended position of the shutter. The slat carriers, when pushed together as closely as possible, bring about closure of the shutter which indicates the unextended position thereof as shown, for instance, at 4 in said Figs. 1 and 5. The convex ridge portion 1'' on each slat fits closely or nests into the depression 1' of the adjacent slat, so that there are substantially no gaps between the slats.

It will be observed that the shape of the slats, whether that shown in Fig. 2 or Fig. 3, is such that in the extended position the line of vision through the gap between the slats is not at right angles to the plane of the surface of the shutter but slanting relative to the latter (see Fig. 3). Thus, when the shutter is not used in extended position, direct vision through the shutter will be impeded without preventing the entrance of light and air.

When mounted for use, the slat carriers 2, 2' at each side of the shutter slide in fixed channel section slide members and in order to center the slat cariers 2, 2' snugly in the slide members and to prevent looseness, the side flanges of the carriers are provided with projections 2ᵃ, 2c, which bear against the side flanges of the fixed slide members.

Also, the pins 3 have raised heads, as indicated at 3" and 3'" (Figs. 1 and 5), which bear against the web or bottom of the channel section fixed slide members, thus further assisting in holding the carriers 2, 2' snugly in the slide members. Thus, the carriers 2, 2' have three points of support in said slide members.

If desired, the slats may be fitted with additional supporting members, such as indicated at 5 in Fig. 2 to give greater rigidity and steadiness to the shutter, particularly in the case of shutters of greater than normal lengths. The rolling up or unrolling of shutters constructed according to the present invention is performed in the same way as known shutters.

While various changes may be made in the detailed construction, it shall be understood that such changes shall be within the spirit and scope of the present invention as defined by the appended claims.

Having thus described the invention, what is claimed as new and desired to be secured by Letters Patent, is:

1. A shutter structure comprising a plurality of slats, pairs of slat carriers, each pair of slat carriers supporting the ends of a respective slat, each slat carrier being connected to the adjacent slat carrier and being provided with an elongated slot and with an opening for the insertion of a pin, and pins removably extending through the opening of one slat carrier and through the elongated slot of an adjacent slat carrier and in engagement with the respective slat, whereby said adjacent slat carrier and said respective slat may be moved with respect to each other.

2. A shutter structure comprising a plurality of slats, slat carriers arranged to engage said slats in endwise direction thereof, each pair of slat carriers being connected to a respective slat, each slat being, respectively, provided at upper and lower ends thereof with a concave depression and with a curled-over portion forming a convex ridge, the curled-over portion of one of said slats being adapted to nest in the concave depression of an adjacent slat, each slat carrier being provided with an elongated slot and with an opening, a pin at each end of each slat extending through the opening of one slat carrier and through the elongated slot of an adjacent slat carrier and projecting into said convex ridge of said slat, whereby said slat may be moved with respect to an adjacent slat and said convex ridge of said one slat be spaced from the concave depression of said adjacent slat.

3. A shutter structure according to claim 2, wherein said convex ridge extends at the lower end of each slat whereas the concave depression is provided adjacent the upper end of each slat, said depression and said ridge extending from end to end of each slat.

4. A shutter structure according to claim 2, wherein each pin is provided with a constricted neck portion, said convex ridge of each slat also being provided with constricted portions adapted for engagement with said constricted neck portions of said pins.

UMBERTO COCHETTI.

REFERENCES CITED

The following references are of record in the file of this patent:

UNITED STATES PATENTS

| Number | Name | Date |
| --- | --- | --- |
| 1,374,514 | Motteau | Apr. 12, 1921 |
| 1,408,076 | Bretos | Feb. 28, 1922 |